United States Patent
Law et al.

(10) Patent No.: US 7,099,676 B2
(45) Date of Patent: Aug. 29, 2006

(54) SYSTEM AND METHOD FOR LOCATION AND MOTION DETECTION IN A HOME WIRELESS NETWORK

(75) Inventors: Ho Kee Law, Santa Clara, CA (US); Yoshifumi Nishida, Yokohama (JP)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 169 days.

(21) Appl. No.: 10/821,385

(22) Filed: Apr. 9, 2004

(65) Prior Publication Data
US 2005/0227707 A1 Oct. 13, 2005

(51) Int. Cl.
*H04Q 7/20* (2006.01)

(52) U.S. Cl. .......... 455/456.6; 455/115.3; 455/226.2; 455/456.1; 342/450; 342/458

(58) Field of Classification Search .......... 455/3.06, 455/66.1, 404.2, 422.1, 456.1, 456.6, 115.3, 455/226.2, 517, 518; 342/450, 458; 370/338
See application file for complete search history.

(56) References Cited

U.S. PATENT DOCUMENTS

| | | | |
|---|---|---|---|
| 5,719,584 A | 2/1998 | Otto | |
| 5,732,354 A * | 3/1998 | MacDonald | 455/456.2 |
| 6,138,021 A | 10/2000 | Arrington, Jr. et al. | |
| 6,246,861 B1 * | 6/2001 | Messier et al. | 455/12.1 |
| 6,362,783 B1 * | 3/2002 | Sugiura et al. | 342/457 |
| 6,414,634 B1 | 7/2002 | Tekinay | |
| 6,583,761 B1 | 6/2003 | Angermeier et al. | |
| 6,597,915 B1 * | 7/2003 | Shi et al. | 340/825.49 |
| 6,745,038 B1 * | 6/2004 | Callaway et al. | 455/456.1 |
| 2002/0122405 A1 | 9/2002 | Liang | |
| 2002/0196188 A1 | 12/2002 | Holt | |
| 2003/0043073 A1 * | 3/2003 | Gray et al. | 342/465 |
| 2003/0052821 A1 | 3/2003 | Holt | |
| 2003/0229445 A1 | 12/2003 | Tingley | |
| 2003/0232598 A1 * | 12/2003 | Aljadeff et al. | 455/41.2 |
| 2003/0235175 A1 | 12/2003 | Naghian et al. | |
| 2003/0236866 A1 * | 12/2003 | Light | 709/220 |
| 2004/0192331 A1 * | 9/2004 | Gorday et al. | 455/456.1 |
| 2004/0203904 A1 * | 10/2004 | Gwon et al. | 455/456.1 |

(Continued)

FOREIGN PATENT DOCUMENTS

EP 1039689 A2 * 9/2000

*Primary Examiner*—William Trost
*Assistant Examiner*—James D Ewart
(74) *Attorney, Agent, or Firm*—John P. O'Banion (57) ABSTRACT

A method and system for determining location and/or motion for one or more wireless devices communicating at short range (i.e. less than about 30 feet) with other wireless devices on a wireless network. Signal strength measurements are passed within communication frames between wireless devices which can be used to represent an inverse of the distance, wherefrom a distance vector is determined between wireless devices. Using multiple distance vectors from multiple wireless network devices, a 2-D or 3-D coordinate representation for position of each wireless network in 2-D or 3-D space can be calculated. These coordinates can be utilized for determining the precise traveled position of a specific wireless network device in motion and for establishing a motion sensing system. The motion sensing system can be configured as input to a user interface to control devices and systems which integrated within or connected to devices communicating on the wireless network.

37 Claims, 5 Drawing Sheets

U.S. PATENT DOCUMENTS

| | | | |
|---|---|---|---|
| 2004/0263388 A1* | 12/2004 | Krumm et al. | 342/451 |
| 2005/0130677 A1* | 6/2005 | Meunier et al. | 455/456.6 |
| 2005/0143101 A1* | 6/2005 | Kyperountas et al. | 455/456.6 |
| 2005/0143119 A1* | 6/2005 | Chandra et al. | 455/522 |
| 2005/0162271 A1* | 7/2005 | Leitch | 340/539.13 |
| 2005/0185615 A1* | 8/2005 | Zegelin | 370/331 |
| 2005/0227707 A1* | 10/2005 | Law et al. | 455/456.1 |
| 2005/0233748 A1* | 10/2005 | Robinson et al. | 455/440 |

* cited by examiner

FIG. 8

SYSTEM AND METHOD FOR LOCATION AND MOTION DETECTION IN A HOME WIRELESS NETWORK

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention pertains generally to communication networks, and more particularly to systems and methods calculating distance vectors between wireless network devices.

2. Description of Related Art

The Open System Interconnection (OSI) standard provides a seven layered hierarchy between an end user and a physical device through which various network systems can communicate. Each layer is responsible for different tasks and the OSI protocol specifies the interaction between layers while ensuring that the communication devices comply with the standard.

Figure 1:
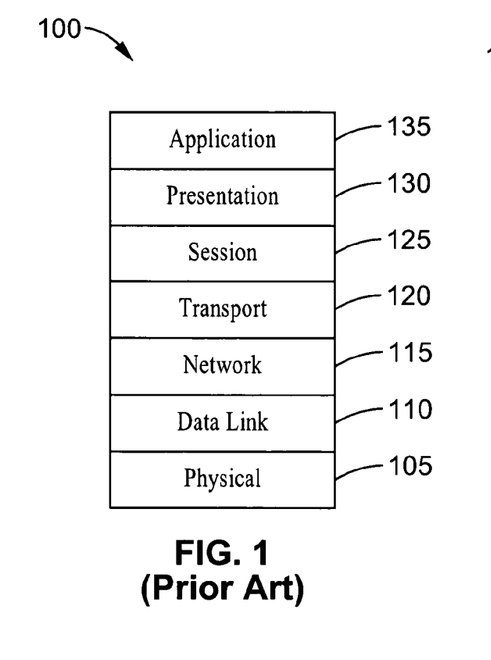
FIG. 1 is a layer topology for the conventional OSI standard for a computer communication architecture.

FIG. 1 shows the hierarchy 100 of the seven-layered OSI standard, which includes a physical layer 105, a data link layer 110, a network layer 115, a transport layer 120, a session layer 125, a presentation layer 130 and an application layer 135.

The physical layer 105 conveys the bit stream through the network at the electrical, mechanical and functional level, while providing a hardware means of sending and receiving data on a carrier. The data link layer 110 provides the representation of bits on the physical medium and the format of messages on the physical medium, sending blocks of data, such as frames, with proper synchronization. The networking layer 115 handles the routing and forwarding of the data to proper destinations, while maintaining and terminating connections. The transport layer 120 manages the end-to-end control and error checking to ensure complete data transfer. The session layer 125 sets up coordinates, and terminates communications between applications. The presentation layer 130 converts incoming and outgoing data from one presentation format to another. The applications layer 135 is where communications, quality of service, user authentication, and so forth are considered.

Figure 2:
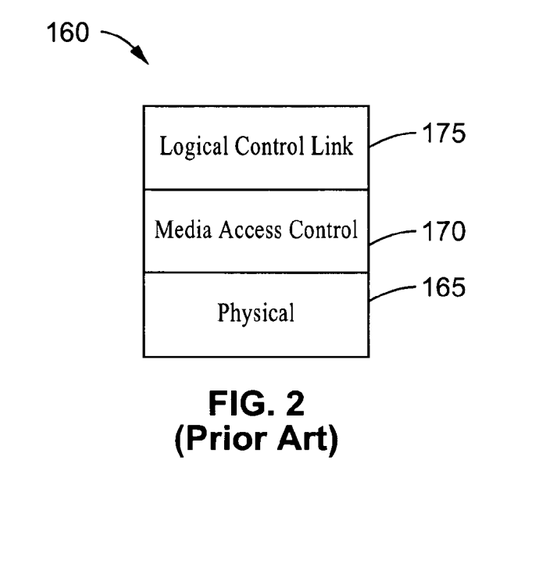
FIG. 2 is a layer topology for the IEEE 802 wireless standard.
Figure 3:
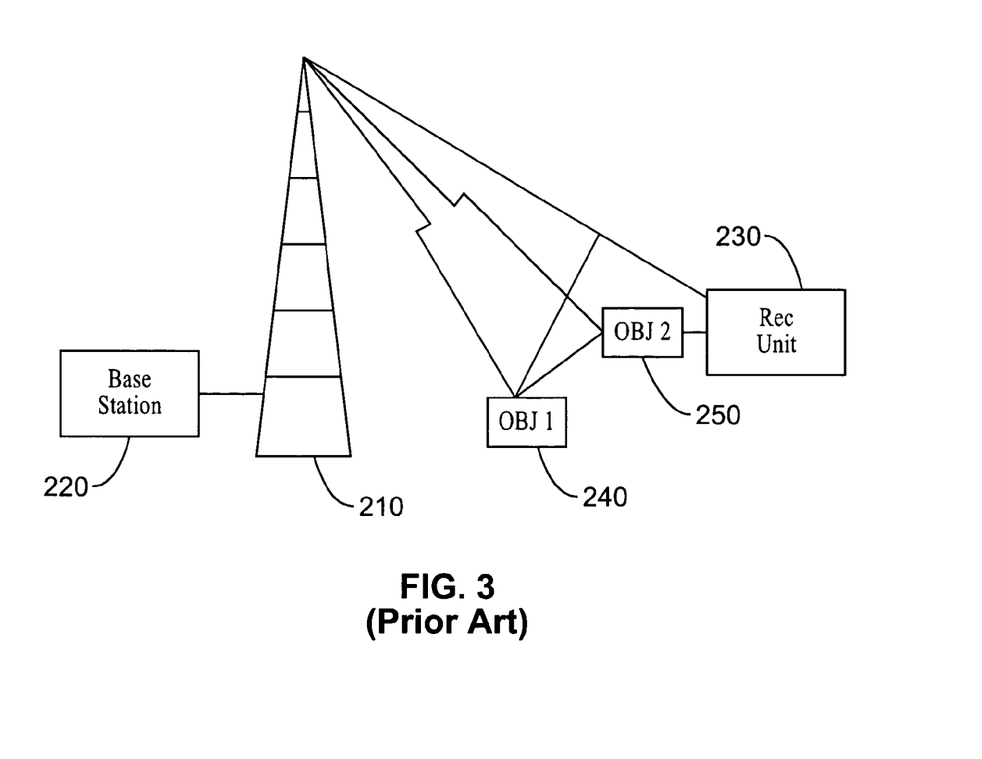
FIG. 3 is a block diagram of a conventional fixed based communication scenario in which multipath communication effects arise.

Similar to the OSI standard, the IEEE 802 committee has developed a three layer architecture for wireless networks that roughly corresponds to the physical layer and data link layer of the OSI standard. FIG. 2 illustrates the IEEE 802 standard 160. As shown in FIG. 2, the IEEE 802 standard includes a physical layer 165, a media access control (MAC) layer 170, and a logical link control layer 175. The physical layer 165 operates similar to the physical layer in the OSI standard. The MAC and the logical link control layers share the functions of the data link layer in the OSI standard 100. The logical link control layer 175 places data into frames that can communicate at the physical layer 165 and the MAC layer 170 manages communications over the data link sending data frames and receiving acknowledgment (ACK) frames.

Together the MAC layer 170 and the link control layer 175 are responsible for error checking as well as retransmission of frames that are not received and acknowledged.

The IEEE 802.11 standard also defines beacon frames within the MAC layer which are sent at regular intervals by an access point. The access point may act as a bridge between two networks with different protocols (e.g., Ethernet and IEEE 802 wireless networks).

Wireless technologies have been integrated into our daily lives and are being required to provide not only connectivity, but also high performance, reliability and stable communication. The most dominant of the IEEE 802 wireless communication standards is IEEE 802.11 and its variants, such as 802.11a, 802.11b, 802.11g which are being utilized in various wireless products. Communication between different devices (nodes) in the IEEE 802 network is performed by the exchanging of data frames between a sending node and a receiving node. Each IEEE 802.11b frame transmitted from a IEEE 802.11 equipped device contains information including the signal strength and noise. By measuring the signal strength information and including it in frames sent from a fixed node to a mobile node, it is possible to approximate the distance between fixed and mobile nodes.

However, it is very difficult to determine the exact location of a node at any point in time, because IEEE 802.11b is very susceptible to the effects of multipath fading, a multipath scenario illustrated in FIG. 2. As shown in the figure, a transmission emitting from a base station 220 is transmitted by an antenna 210. The transmission may take a direct path to a receiving mobile node 230 or, given the physical surroundings, the transmission may radiate, reflect or be diffused by one or more objects 240 and 250 that are closer to antenna 210. This causes a multipath propagation of the signal directed towards the receiving device 230.

Similarly, in a mobile wireless network system, such as a home wireless network, the occurrence of multipath propagation may cause the perceived signal strength information at one wireless network communication device to fluctuate greatly as a result of the slightest movement of the node or changes in the surroundings such as movement of obstacles in the line of sight. The fluctuation in signal strength makes it difficult to determine the location of one wireless network communication device relative to the other wireless devices in the wireless network.

Furthermore, the inability to accurately monitor movements of the different wireless network devices within the wireless network, sometimes impacts the ability to detect the addition or removal of a wireless network device from the wireless network.

Therefore, a need exists to monitor the signal strength between mobile wireless network devices communicating over a wireless network in order to determine the relative proximity and/or motion with respect to other wireless devices on the wireless network. The present invention fulfills that need as well as others and overcomes many of the deficiencies of prior network systems.

BRIEF SUMMARY OF THE INVENTION

The invention provides a data processing apparatus and method for optimizing network data processing between wireless network communication devices. The present invention generally allows the detection of a mobile wireless network device relative to other wireless network communication devices in a wireless network system such as a home wireless network system.

The present invention can provide a level of optimization of detecting the presence of a node, or nodes, in the mobile wireless network as the distance between the node, or nodes, and the other nodes in the wireless network is reduced.

The present invention provides a signal strength detection method that performs analysis on the signal strength in a set of recorded signals transmitted between the mobile wireless device and the target wireless network device. The signal information can be used to represent an inverse of the distance or as a metric to calculate the distance vector between the wireless networks to determine proximity of the mobile wireless device to the target wireless device.

The invention also provides for generating a three-dimensional coordinate representation of each node in the wireless network, in up to three-dimensional space.

The coordinates can be utilized for determining the precise traveled distance of a particular wireless network node (device) relative to the other nodes in the wireless network.

Mapping of the node coordinates also allows for creating a motion sensor within the present invention for detecting the movement of the wireless network device relative to the other wireless network devices.

The present invention may be described as a system for detecting two or three-dimensional motion of wireless network devices communicating within a wireless network, comprising: (a) a first network device configured for wirelessly communicating beacon frames which include signal strength information with at least two other network devices; and (b) means for detecting the distances between the first network device and the other network devices in response to signal strength information contained within communication frames to map out the positions of wireless network devices and the motions of one network device in relation to the other network devices. The means for detecting distances preferably comprises a computer configured for communicating with other wireless network devices and programming configured for execution on the computer. The programming is preferably part of a layered protocol supporting a media access control (MAC) layer.

The means for detecting distances may also be described as comprising: (i) a motion monitor module configured for monitoring proximity motion of a plurality of wireless network devices in the wireless network system; (ii) a signal strength monitoring module configured for monitoring the signal strength between communicating network devices within the plurality of wireless network devices; (iii) a signal strength vector coordinates generation module configured for generating vectors based on signal strengths between said plurality of devices; and (iv) a proximity motion sensor module for detecting the relative motion of one or more of the plurality of wireless network devices communicating on the wireless network.

The present invention may also be described as a system for detecting two or three-dimensional motion of wireless network devices communicating within a wireless network, comprising: (a) a first network device configured for wirelessly communicating beacon frames which include signal strength information with at least two other network devices; (b) a motion monitor module configured for monitoring proximity motion of network devices within the plurality of at least three wireless network devices in the wireless network;

(c) a signal strength monitoring module configured for monitoring the signal strength between communicating network devices within the plurality of wireless network devices; (d) a signal strength vector coordinates generation module configured for generating vectors based on signal strengths between the plurality of devices; and (e) a proximity motion sensor module for detecting the relative motion of one or more of the plurality of wireless network devices communicating on the wireless network.

The present invention may also be described as a method of detecting proximity between a plurality of wireless network devices communicating over a wireless network system, comprising: (a) determining distance vectors between a plurality of wireless network devices in response to signal strength information registered from communication of frames between the plurality of wireless network devices; (b) determining a relative three-dimensional coordinate representation for the position of each of said plurality of wireless network devices; (c) determining a precise distance traveled position of a particular wireless network device in motion with respect to the other wireless network devices communicating in the wireless network; and (d) generating motion sensor outputs responsive to the coordinate representation of the plurality of wireless network devices for detecting the motion of any particular one of the plurality of the wireless network devices with respect to the other wireless network devices communicating on the wireless network.

The method can further comprise determining distance changes between each of the wireless network devices relative to the other wireless network devices in the wireless network.

The present invention is configured for providing numerous inventive aspects, including but not limited to the following.

An aspect of the present invention is the mapping of locations of wireless nodes communicating within a wireless network.

Another aspect of the present invention is the detection of motion for a mobile wireless network device communicating over a wireless network.

Another aspect of the present invention is the control of devices in response to the motion of wireless devices communicating over the wireless network.

Another aspect of the present invention is that it may be implemented within programming for the media access control layer, or equivalent, within a layered wireless communication protocol.

Another aspect of the present invention is that it is particularly well suited for use in the IEEE 802 wireless standards, such as IEEE 802.11g.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only.

DETAILED DESCRIPTION OF THE INVENTION

Referring more specifically to the drawings, for illustrative purposes the present invention is embodied in the apparatus generally shown in FIG. 4 through FIG. 8. It will be appreciated that the apparatus may vary as to configuration and as to details of the parts, and that the method may vary as to the specific steps and sequence, without departing from the basic concepts as disclosed herein.

The present invention provides proximity motion detection within a wireless network system. The present invention describes systems and methods which are preferably executed by programming within electronic media devices containing a processing element (computer) and the programming is preferably incorporated into the IEEE 802.11 protocol MAC layer to improve the analysis of the signal strength between mobile wireless network devices that communicate with other wireless network devices in a wireless network system. The present invention overcomes the problems with multipath fading that often arises with the use of the conventional IEEE 802.11 wireless network standard. The consequence of multipath fading when two wireless network devices try to communicate, is that errors are generated which make it difficult to determine an accurate location for a mobile wireless device within a network. Additional problems also arise with regard to proximity motion identification which are overcome by preferred embodiments of the present invention.

Figure 4:
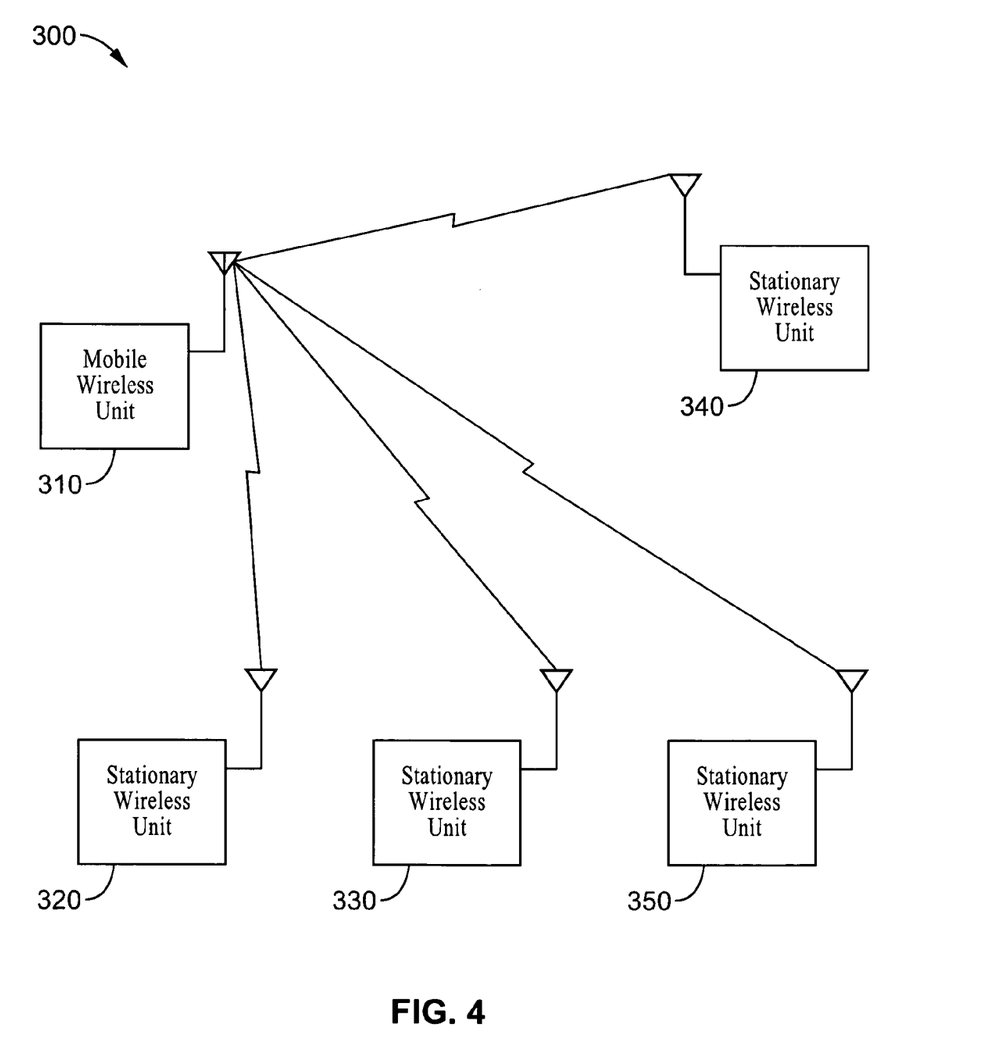
FIG. 4 is a block diagram of proximity motion detection according to an aspect of the present invention, showing an example scenario of five wireless network devices.

FIG. 4 illustrates a network system 300 having a mobile wireless network device 310 that is in motion with respect to a wireless network device 320 placed within a predetermined range. The predetermined range preferably approximating the distances within a given room, or vicinity (i.e. residential home environment) within which media devices are communicating over the wireless network, for example within about ten to thirty feet. From this initial state, the mobile wireless network device 310 can move towards, for example, the non-mobile wireless network devices 320, 330, 340 and 350 so that the distance between the devices reduces. For example the distance between the mobile wireless network 310 and the stationary wireless network device 320 may be reduced to about six feet. In this range, the signal strength between the wireless network communication device 310 and the wireless network communication device 320 may be approximately 150 dBm. Within the present invention, the signal strength in decibels, which is carried in the communication frames, can be considered to be inversely proportional to the distance, and utilized as a representation of inverse distance. For example, the signal strength detected between wireless network device 310 and wireless network device 320 can be preferably utilized to represent the inverse of distance metric, or as an input for calculating distance vectors between the devices within the wireless network. It should be appreciated that divisions, as per an inverse, are performed in the logarithmic decibels scale as subtractions. The signal strength value in dBm can be subtracted from an estimated (i.e. selected typical case value such as 200 dBm) or actual base line proximal signal strength value (i.e. determined by sweeping the device proximal to the receiver and registering the signal strength), thus calibrating the unit with a base line proximal distance signal strength.

Figure 5:
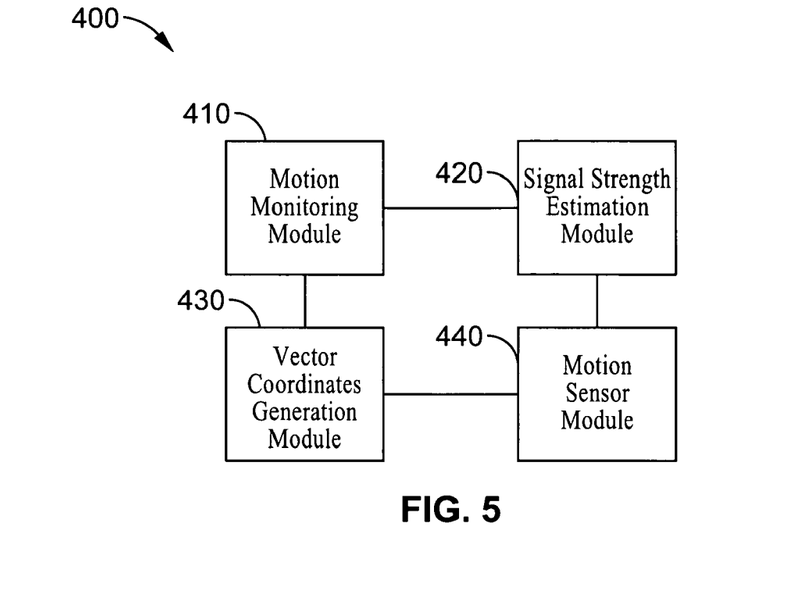
FIG. 5 is a block diagram of the proximity motion detection system according to an embodiment of the present invention, showing four interconnected modules.

FIG. 5 illustrates by way of example modules within the proximity motion detection logic 400 according to one embodiment of the present invention. It will be understood by those skilled in the art that only those elements necessary for the implementation of the present invention are shown in the figure. Proximity motion detection embodiment 400 is shown comprising a motion monitoring module 410, a signal strength estimation module 420, a vector coordination generation module 430 and a motion sensor module 440. It should be understood that these modules may be implemented as programming for a computer (preferred), as hardware modules within a communication circuit, or a combination thereof without departing from the teachings of the present invention.

Motion monitoring module 410 monitors the signals transmitted from a mobile wireless network device to the wireless network system to determine the signal strength between the mobile wireless network device and a receiving wireless network. The proximity motion detection method of the invention is implemented within one or more of the wireless network devices communicating on the wireless network system.

Signal strength estimation module 420 calculates the signal strength between communicating wireless network devices in the wireless network system to determine the distance vector between the communicating wireless network devices. The signal strength estimation module 420 preferably utilizes the signal strength between communicating wireless network devices as an inverse of distance representation. It should be appreciated that actual distance values can be calculated based on the field strength values, such as in response to a calibration phase which generates a field strength value for a known distance, such as under 15 cm or more preferably at or less than 5 cm.

Vector generation module 430 is configured to utilize the distance vectors from multiple wireless network devices in the wireless network system to calculate a relative three-dimensional coordinate representation for the position of each wireless network device in the wireless networks system in three-dimensional space. In the present invention some or all of the wireless network devices coordinate their operations to enable the motion sensor module 440 to calculate a precise traveled position for a particular wireless network device communicating within the wireless network system, which can operate as a motion detection system. It will be appreciated that the inverse of signal strength values generally comport well to distance values when the wireless devices are retained in proximity to one another so that multipath effects are not a significant factor. As previously mentioned the registered signal strength values can be subtracted from a base line (proximal) signal strength value to yield a distance metric.

Figure 6:
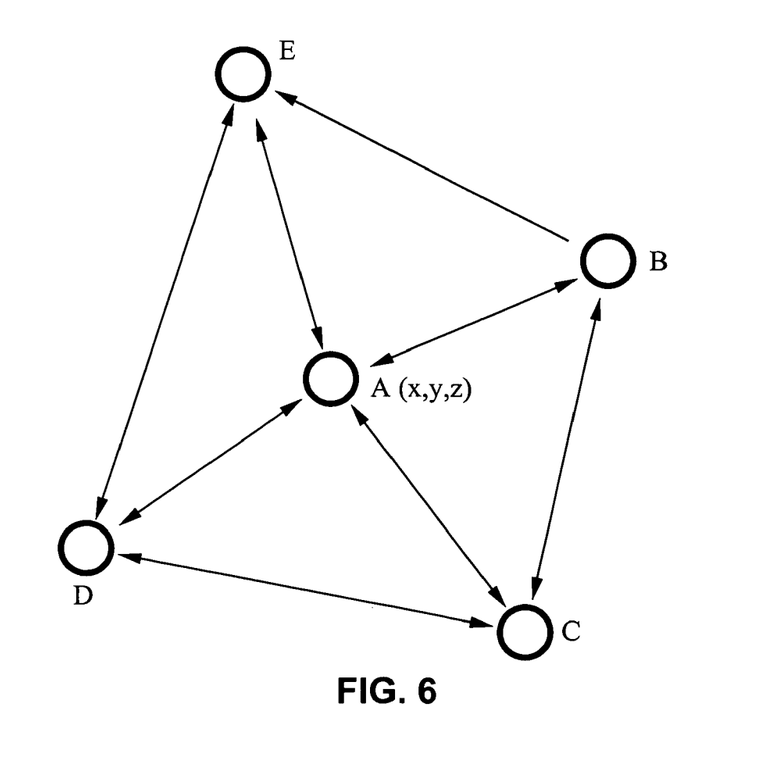
FIG. 6 is a graphical diagram of a multi-vector representation of a wireless network according to an aspect of the present invention, and showing proximity motion between the wireless nodes.

FIG. 6 is a depiction of vector distance representation for an example wireless network. The wireless network is shown containing multiple wireless network devices, exemplified as network devices A–E. Each dot in FIG. 6 represents a wireless network point (x, y, z) within a three-dimensional system of coordinates allowing each of the wireless network devices to be mapped (represented). In one embodiment of the present invention, the (x, y, z) coordinate system is generated in response to a matrix of distances between each of the wireless network devices A–E. It will be appreciated that given any three points and their corresponding distances (or signal strengths) a two-dimensional coordinate system in a two-dimensional plane is created to represent the motion of the wireless network devices, for example considering points representing wireless network devices A, B and C. Alternatively, given any four points and their corresponding distance, a three-dimensional coordinate system in three-dimensional space can be created.

Figure 7:
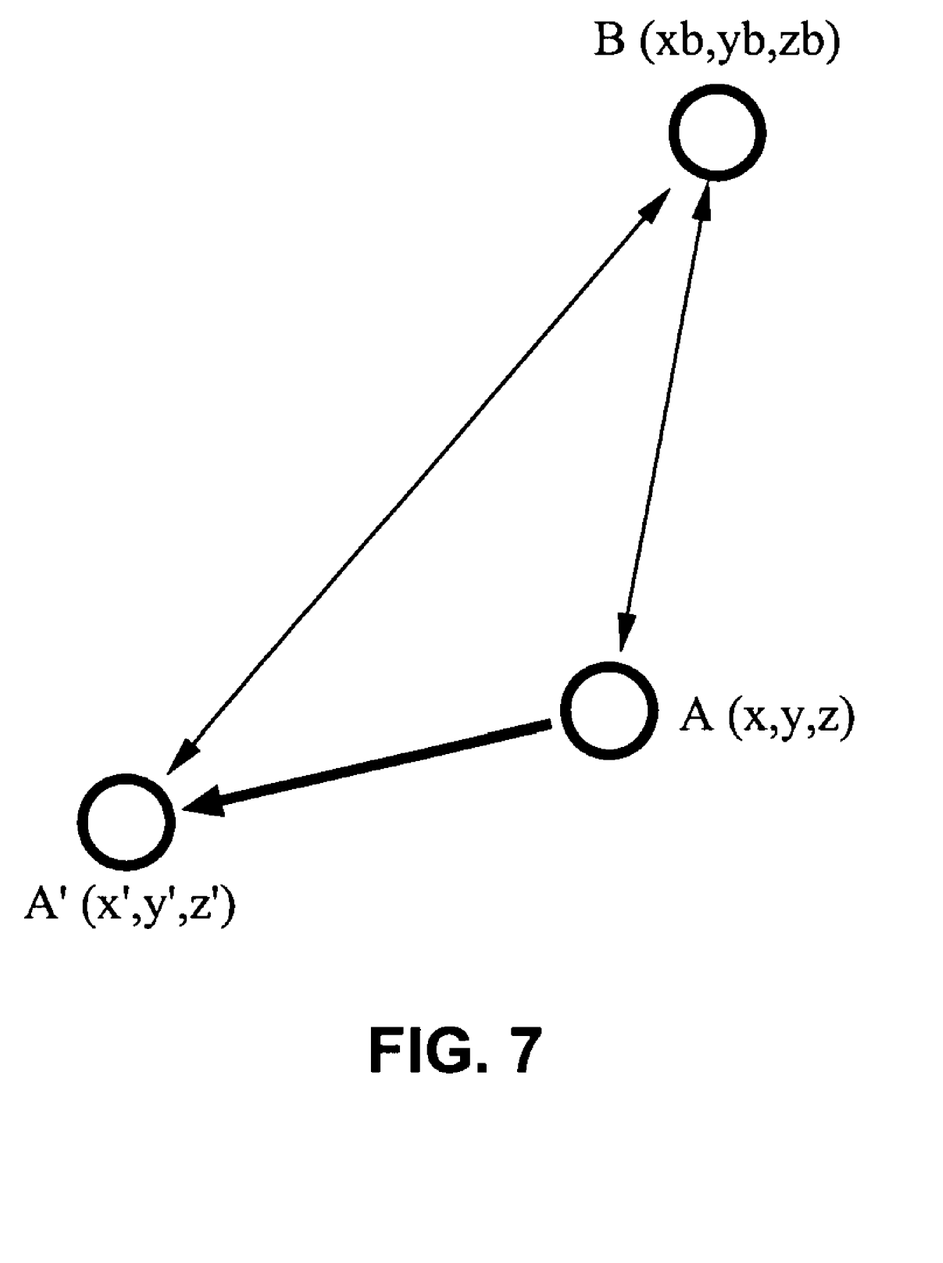
FIG. 7 is a graphical diagram of a coordinate system of a wireless network according to an aspect of the present invention, shown in proximity motion relative to another wireless network.

FIG. 7 depicts a precision distance estimation scheme of the present invention. In this example, the distance between wireless network device B having three-dimensional coordinates and corresponding distance (xb, yb, zb) with respect to the wireless network device A, also with a three-dimensional coordinates (x, y, z) may be used as a coordinate system to determine the precise distance between wireless network device A and wireless network device B. In this illustration as wireless network A device moves from (x, y, z) to (x', y', z'), the distance traveled by the wireless network A device is used to create a motion sensor system to detect the movement of wireless network A device. In one embodiment of the present invention, using the coordinate of the initial point (origination) and the destination point (e.g., x', y', z') the direction traveled at any given time by wireless network device A can be determined. Similarly, the distance traveled by the wireless network device A can be determined given the same initial point and destination point. Furthermore, the speed of the wireless network device A relative to the wireless network device B can also be calculated by the present invention from the initial and destination point of the wireless network device A. In one embodiment of the present invention, the direction, distance and speed information can be received by a user interface control module as inputs for controlling the activity of devices, such as devices coupled to the wireless network. It should also be appreciated that network device motion and mapping as previously described can be utilized for precise dynamic configurations of network topologies, network feedback, network joining and unjoining, and other issues relating to an understanding of the positional relationships between the network devices.

Figure 8:
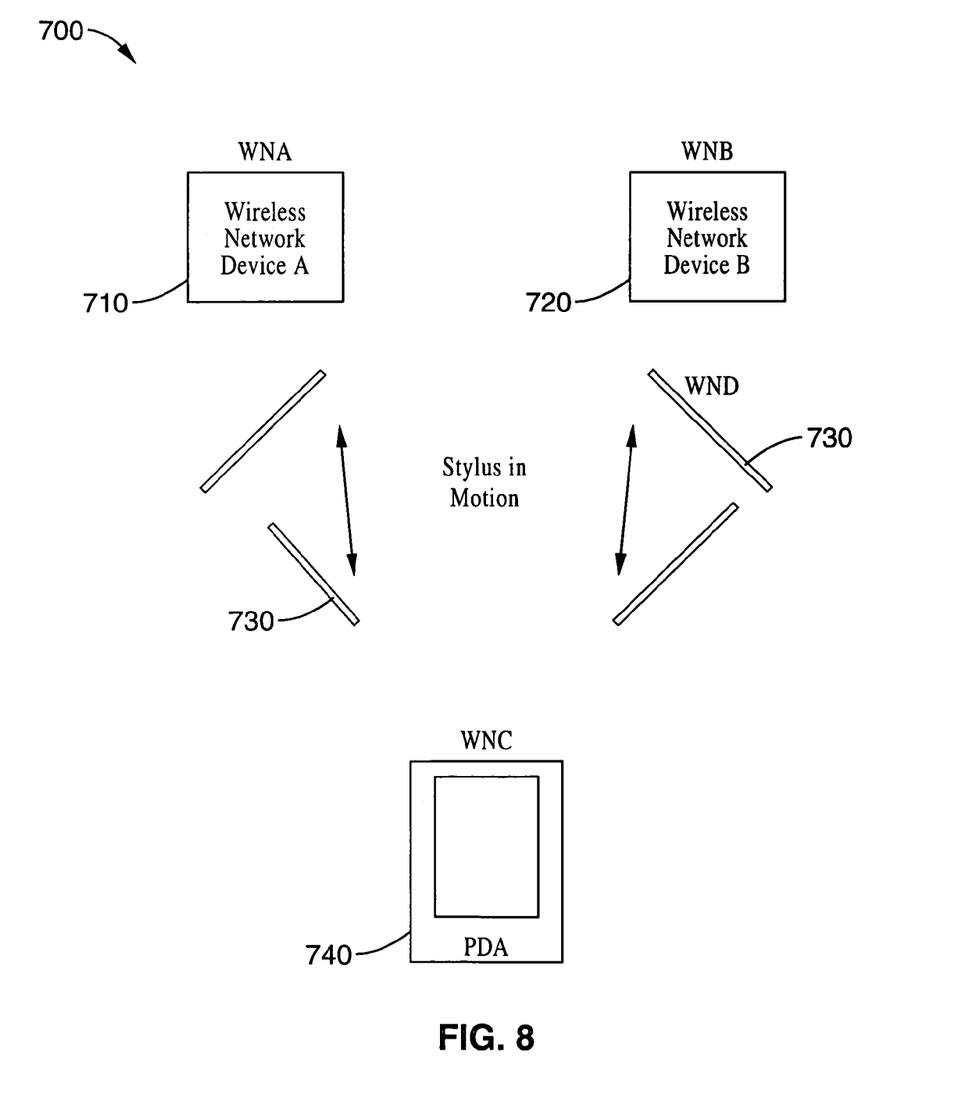
FIG. 8 is a block diagram of user interface control according to an aspect of the present invention, shown registering user input commands in response to proximal motion of mobile wireless nodes.

FIG. 8 is an illustration of a wireless network system environment of one embodiment of the present invention. As shown in FIG. 8, the wireless network system environment 700 comprises wireless network device (WNA) 710, wireless network device (WNB) 720, wireless network device (WNC) 740 and wireless network device (WND) 730. By way of example, and not limitation, WNA 710 is shown comprising a desktop personal computer, WNB 720 a television, WNC 740 a personal digital assistant (PDA) and WND 730 a stylus.

The above example is configured as a motion sensor for detecting movement vectors of stylus WND 730 in relation to WNA 710, WNB 720, and WND 740. It should be noted that the location and distance of WNA 710 and WNB 720 are relatively fixed and can provide reference information. In addition, when new wireless devices come into, or go out of range, the coordinates and positions of all devices can be recalibrated. The sensor system therefore can provide determinations of direction, distance, and speed for WND 730. In this example if WND 730 is moving from WNC 740 towards WNB 720, with the prediction of the source and the target wireless network devices, the system could have the two wireless network devices interact with each other. For example, the image in the WNC 740 could be dragged into the WNB 720. It should be recognized that the above technique can support motion based user input within a number of applications.

It should be recognized that the above technology differs from that provided by positioning systems such as GPS or cellular phone location sensor technology, as it operates on different principles and can provide more precise measurements. The present methods and system are particular well suited to scenarios in which the network devices are positioned within a sufficiently short range of one another so as to limit multipath effects and provide sufficient location or motion accuracy.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A system, comprising:
a plurality of communication devices;
said communication devices configured for communication over a wireless network;
said communication devices configured for communicating signal strength information within communication frames;
said plurality of communication devices comprising a first communication device, a second communication device, and a third communication device;
said first communication device comprising a detector,
said detector configured for determining relative distance between said first communication device and said second and third communication devices in response to receiving signal strength information from said second and third communication devices;
wherein said detector is configured to determine said relative distance between said first communication device and said second and third communication devices to determine motion of said first communication device relative to said second and third communication devices; and
wherein said detector is configured for generating motion information for input to a user interface.

2. A system as recited in claim 1, wherein said detector comprises:
a computer; and
programming, executable on said computer, configured for,
communicating wirelessly between said first communication device and said second and third communication devices according to a layered protocol,
supporting a media access control layer within said layered protocol,
detecting distance between said first communication device and said second and third communication devices in response to the signal strength information, and
determining motion of said first communication device in relation to said second and third communication devices in response to detected distance between said first communication device and said second and third communication devices.

3. A system as recited in claim 2, wherein said programming is further configured for:
generating distance vectors between said first communication device and said second and third communication devices based on the signal strength information.

4. A system as recited in claim 1, wherein said detector comprises:
a signal strength estimation module configured for estimating signal strength between said first communication device and said second and third communication devices;
a vector coordinates generation module configured for generating distance vectors based on estimated signal strengths from said signal strength estimation module; and
a proximity motion sensor module for detecting relative motion of said first communication device and said second and third communication devices based on distance vectors from said vector coordinates generation module.

5. A system, comprising:
a plurality of wireless network communication devices;
said plurality of wireless network communication devices comprising a first network communication device, a second network communication device and a third network communication device;
said first network communication device configured for wirelessly communicating beacon frames which include signal strength information;
a motion monitor module, within said first network communication device, configured for monitoring proximity motion of said first network communication device and said second and third network communication devices;
a signal strength estimation module, within said first network communication device, configured for estimating signal strength information among said first network communication device and said second and third network communication devices;
a vector coordinates generation module, within said first network communication device, configured for generating distance vectors based on signal strength estimations from said signal strength estimation module; and
a proximity motion sensor module, within said first network communication device, configured for detecting relative motion of said first network communication device and said second and third network communication devices based on distance vectors from said vector coordinates generation module,
wherein said proximity motion sensor module is configured for generating motion information for use within a user interface.

6. A system as recited in claim 5, further comprising:
means for recalibrating coordinate and position information of a fourth network communication device when said fourth network communication device enters or leaves the network on which said plurality of network communication devices are operating.

7. A system as recited in claim 5, wherein said vector coordinates generation module is configured for calculating a relative two-dimensional or three-dimensional coordinate representation of position of each of said network communication devices.

8. A system as recited in claim 5, wherein said vector coordinates generation module is configured for calculating a precise position of said first network communication device in motion with respect to said second and third network communication devices communicating on the wireless network.

9. A system as recited in claim 5, wherein said vector coordinates generation module is configured for utilizing a coordinate representation of initial points and destination points to determine direction of travel of a particular wireless network communication device at a given time within the wireless network.

10. A system as recited in claim 9, wherein said vector coordinates generation module is configured for utilizing a coordinate representation of initial points and destination points to determine distance traveled by a particular wireless network communication device at a given time.

11. A system as recited in claim 5, wherein said vector coordinate generation module is configured for utilizing a coordinate representation of initial points and destination points to calculate the speed traveled by a particular wireless network devices at a given time.

12. A system as recited in claim 5, wherein said vector coordinate generation module is configured for generating a relative two-dimensional or three-dimensional coordinate representation of distance vectors from said plurality of network communication devices to determine relative two-dimensional or three-dimensional coordinates of each of the plurality of network communication devices.

13. A system as recited in claim 12, wherein a matrix of distances between each of said plurality of communication devices communicating in the wireless network is utilized to create the two-dimensional or three-dimensional coordinate representation.

14. A system as recited in claim 5, wherein said signal strength estimation module is configured for sensing relative movement between said first network communication device and said second and third network communication devices communicating in the wireless network.

15. A system as recited in claim 5, wherein said signal strength estimation module is configured for calculating distance changes between said network communication devices communicating in the wireless network.

16. A system as recited in claim 5, wherein said signal strength estimation module is configured for continuously monitoring said beacon frames transmitted by a sending wireless network communication device to a receiving wireless network communication device communicating in said wireless network at a predetermined transmission interval.

17. A system as recited in claim 16, wherein said vector coordinates generation module is configured for generating a two-dimensional coordinate system in a two-dimensional plane in response to determining any three points and their corresponding distances based on said monitoring of beacon frames.

18. A system as recited in claim 16, wherein said vector coordinates generation module is configured for generating a three-dimensional coordinate system in a three-dimensional space in response to determining any four points and their corresponding distances based on said monitoring of beacon frames.

19. A method, comprising:
communicating signal strength information contained within communication frames among a plurality of wireless network devices over a wireless network system;
said plurality of wireless network devices comprising a first wireless network device, a second wireless network device, and a third wireless network device;
determining distance vectors between said first wireless network device within the plurality of wireless network devices in response to signal strength information
determining a relative two-dimensional or three-dimensional coordinate representation for the position of each of said plurality of wireless network devices based on said distance vectors;
determining a precise distance traveled position of said first wireless network device in motion with respect to said second and third wireless network devices communicating on the wireless network in response to said coordinate representation;
generating a motion sensor output responsive to the coordinate representation of said plurality of wireless network devices for detecting the motion of said first wireless network device with respect to said second and third wireless network devices communicating on the wireless; and
inputting motion information from said motion sensor output from said first wireless network device into a user interface module to control operations of one or more devices in response to the proximity detection within said plurality of wireless network devices.

20. A method as recited in claim 19, further comprising determining distance changes between said first wireless network device relative to said second and third wireless network devices in said wireless network system.

21. A method as recited in claim 19, further comprising determining direction of travel of said first wireless network device at a given time utilizing coordinate representations of initial points and destination points.

22. A method as recited in claim 19, further comprising determining the distance traveled by said first wireless network device at a given time utilizing coordinate representations of initial points and destination points.

23. A method as recited in claim 19, further comprising determining the speed traveled by said first wireless network device at a given time utilizing coordinate representation of initial points and destination points.

24. A method as recited in claim 23, further comprising recalibrating coordinate and position information a fourth wireless network device enters or leaves the wireless network.

25. A method as recited in claim 19, wherein determining the relative two-dimensional or three-dimensional coordinate representation comprises calculating the relative two-dimensional or three-dimensional coordinates utilizing multiple distance vectors.

26. A method as recited in claim 19, wherein a matrix of distances between each of the plurality of wireless network devices in the wireless network system is utilized in determining the two-dimensional or three-dimensional coordinate representation.

27. A method as recited in claim 26, wherein given any three points in said matrix and corresponding distance between said points, a two-dimensional coordinate system in a two-dimensional plane is created.

28. A method as recited in claim 26, wherein given any four points in said matrix and their corresponding distance between said points, a three-dimensional coordinate system in a three-dimensional space is created.

29. A method as recited in claim 19, wherein said determining of the signal strength is performed within a selected proximity range.

30. A method as recited in claim 29, wherein said selected proximity range comprises a range which is predetermined for said wireless network.

31. A system for detecting two or three-dimensional motion of a wireless network device communicating within a wireless network, comprising:
a plurality of wireless network devices configured for wireless communication with one another and for sending signal strength information within communication frames; p1 wherein the plurality of wireless network devices comprises a first wireless network device, a second wireless network device, and a third wireless network device, which are configured for wireless communication;
a motion monitor module configured for monitoring proximity motion of said first wireless network device relative to said second and third wireless network devices within said plurality of wireless network devices;
a signal strength estimation module configured for calculating signal strength among communicating wireless network devices within said plurality of wireless network devices;

a vector coordinates generation module is configured for generating vectors based on signal strength estimations communicated among said plurality of wireless network devices; and a proximity motion sensor module configured for detecting the relative motion of said first wireless network device within said plurality of wireless network devices communicating on the wireless network;

wherein said vector coordinates generation module is configured for calculating distance vectors between a plurality of wireless network devices based on signal strength information contained within the communication frames;

wherein said vector coordinates generation module is configured for calculating two-dimensional or three-dimensional coordinate representations for the position of each of said plurality of wireless network devices;

wherein said vector coordinates generation module is configured for determining the direction of travel, distance traveled, and speed of a particular wireless network device at a given time within the wireless network in response to coordinate representation of initial points and destination points;

wherein said vector coordinates generation module is configured for generating a relative two-dimensional or three-dimensional coordinate representation of distance vectors from said plurality of wireless network devices to determine the relative two-dimensional or three-dimensional coordinates of each of the plurality of wireless network devices; and wherein said vector coordinates generation module is configured for generating relative two-dimensional or three-dimensional coordinate representations in response to a matrix of distance information determined among each of said plurality of wireless network devices communicating in the wireless network.

32. A method of detecting motion of a wireless network device within a plurality of wireless network devices communicating over a wireless network system, comprising:

determining distance vectors between at least three wireless network devices within a plurality of wireless network devices in response to signal strength information retained in wireless communication frames and communicated among the plurality of wireless network devices;

determining a relative two-dimensional or three-dimensional coordinate representation for the position of each of said plurality of wireless network devices;

determining a precise distance traveled position of a particular wireless network device in motion with respect to the other wireless network devices communicating on the wireless network;

determining the direction, distance and speed traveled by a particular wireless network device at a given time in response to the coordinate representation of initial points and destination points;

generating motion sensor outputs responsive to the coordinate representation of said plurality of wireless network devices for detecting the motion of any particular one of said plurality of said wireless network devices with respect to the other wireless network devices communicating on the wireless network;

wherein the motion sensor outputs are configured as input information into a user interface module to control operations of one or more devices; and recalibrating coordinate and position information of a new wireless network device when said new wireless network device enters or leaves the wireless network.

33. A method as recited in claim 32, wherein determining the relative two-dimensional or three-dimensional coordinate representation comprises utilizing multiple distance vectors from multiple wireless network devices in the wireless network to calculate the relative two-dimensional or three-dimensional coordinates.

34. A method as recited in claim 33, wherein a matrix of distances between each of the plurality of wireless network devices in the wireless network system is utilized in creating the two-dimensional or three-dimensional coordinate representation.

35. A method as recited in claim 34, wherein a two-dimensional coordinate system in a two-dimensional plane is created given any three points and the corresponding distance between these points.

36. A method as recited in claim 35, wherein a three-dimensional coordinate system in a three-dimensional space is created given any four points and the corresponding distance between these points.

37. A method as recited in claim 32, wherein said motion sensor outputs are configured for communicating position information, motion information, or a combination of position and motion information to a user interface module for controlling operations of one or more devices in response to the proximity detection of the wireless network devices.

* * * * *